(12) United States Patent
James et al.

(10) Patent No.: US 6,839,858 B1
(45) Date of Patent: Jan. 4, 2005

(54) SYSTEM FOR CLOCK SYNCHRONIZATION

(75) Inventors: Michael James, Saratoga, CA (US); Kent Ryhorchuk, Sunnyvale, CA (US)

(73) Assignee: CIENA Corporation, Linthicum, MD (US)

( * ) Notice: Subject to any disclaimer, the term of this patent is extended or adjusted under 35 U.S.C. 154(b) by 668 days.

(21) Appl. No.: 09/855,822

(22) Filed: May 14, 2001

(51) Int. Cl.[7] .............................................. G06F 1/12
(52) U.S. Cl. ..................................... 713/400; 370/503
(58) Field of Search ........................... 713/400; 370/503

(56) References Cited

U.S. PATENT DOCUMENTS

| | | | | |
|---|---|---|---|---|
| 5,953,314 A | * | 9/1999 | Ganmukhi et al. ......... | 370/220 |
| 6,078,595 A | * | 6/2000 | Jones et al. ................. | 370/503 |
| 6,317,439 B1 | * | 11/2001 | Cardona et al. ............ | 370/503 |
| 6,658,579 B1 | * | 12/2003 | Bell et al. ................... | 713/400 |

* cited by examiner

*Primary Examiner*—Thomas Lee
*Assistant Examiner*—Albert Wang
(74) *Attorney, Agent, or Firm*—Michael R. Cammarata; Daniel D. Tagliaferri

(57) ABSTRACT

A timing circuit for use with transport logic in a network element is provided. The network element forms part of a data network and the timing circuit includes a timing receiver having a timing input, a timing output, and a selection input, the timing receiver operable to receive one or more timing signals at the timing input and to select a selected timing signal for distribution to the transport logic via the timing output based on a selection signal received at the selection input. The timing circuit also includes a determination circuit that is operable to determine whether the timing circuit is one of a master timing circuit and slave timing circuit, and based on the determination, produce the selection signal. A sync transmitter is also included in the timing circuit. The sync transmitter is coupled to the timing output, the determination circuit, and a communication channel. The sync transmitter is operable to receive the selected timing signal and to transmit the selected timing signal on the communication channel when the determination circuit determines that the timing circuit is the master timing circuit.

24 Claims, 6 Drawing Sheets

SYSTEM FOR CLOCK SYNCHRONIZATION

FIELD OF THE INVENTION

The present invention relates to timing synchronization in a data network, and more particularly, to a synchronization system for providing clock synchronization to transport logic in a network element of an optical network.

BACKGROUND OF THE INVENTION

Optical networks are becoming widely used for distributing both high and low speed data over varying distances. Typically, an optical network is comprised of a number of network elements (NE) that are connected to each other in a variety of configurations so as to form a unified communication network. The communication network may extend over a small area, such as a company wide network, or may cover large distances, such as in regional or nationwide networks. Typically, the NE's allow network clients to input data for transmission over the network and to receive data transmitted over the network from other locations. Thus, data may be added or dropped from the network at NE locations as the data flows from point to point throughout the network.

FIG. 1 shows a typical data network that includes NEs (100, 102, 104, 106) coupled together via bi-directional optical links 107 to form a unified data network. The optical links transit data in optical form between NEs, and each link may in fact comprise several optical transmission paths across different optical fibers. Within each NE are add/drop multiplexer (ADM) cards (108, 110, 112, 114) that are used to add, drop, and transport data over the network for a particular client. For example, client A's data is added to the network via ADM 108 at NE 100 and removed from the network via ADM 112 at NE 104. Typically, the ADM cards are provided as a two card set, which allows redundancy and thereby provides a level of protection for the data. For example, the card set may provide for the transmission of working traffic and protection traffic, which include the same data. The working and protection traffic are split between the two cards so that if the card carrying the working traffic fails, the card carrying the protection traffic can take over to transmit the data over the network.

FIG. 2 shows a typical NE 200 and its internal configuration. The NE 200 includes several pairs of line cards that are dedicated for use by network clients to transmit and receive data via the optical network. For example, in the NE 200 are line cards for clients A, B, and C as shown. The line cards may be router cards, transport cards, such as ADM cards, or other types of network cards. Assuming that the line cards are ADM transport cards, these cards typically have an input to receive client data and an output to transmit the client data over the network. To perform this function, the line cards must be synchronized to receive their respective client's data. The line cards achieve synchronization by receiving timing signals 204 from a timing card 206. The timing signals 204 are generated by the timing card 206 in response to an input reference 208. The line cards receive this reference and use it to synchronize to their respective client's data. However, because the clients may be transmitting data of differing rates, it may be necessary for the line cards to adjust, using time delays or offsets, to synchronize to their respective client's data using the timing signals 204. Thus, in a typical NE, a centralized timing system is used, where a centralized timing card generates timing signals that are distributed to all other line cards in the NE. Based on the data rates to be supported by the line cards, each may have to adjust to compensate for differing rates. Furthermore, the centralized timing card includes expensive components and takes up valuable space in the NE.

FIG. 3 shows a typical timing circuit 300 used on a dedicated timing card in an NE, for example, the timing card 206 of FIG. 2. The timing circuit 300 includes a multiplexer 302 that receives several timing signals that comprise the timing reference 208. The timing reference 208 includes a time reference from each of clients A, B and C, and an external time reference (EXT). The EXT timing reference may be any timing reference suitable for operating the NE within the network.

The MUX 302 is operated to select one of the timing signals and outputs that signal to a filter 306, which filters the signal to remove unwanted noise. The filtered signal is then input to a phase lock loop (PLL) circuit 308 that is coupled to a high quality oscillator 310 to stabilize the filtered timing signal. The output of the PLL is then input to a multiplier circuit 312 that generates one or more of the NE timing signals 204 based on the PLL output signal. The NE timing signals 204 are then distributed to all other line cards in the NE.

The result of using a centralized timing system is that all line cards must then synchronize to their respective data using timing signals generated from one timing source. For example, it is possible to select the timing reference signal provided by client A to generate the central timing signals that are distributed to the line cards in the NE. This will work well for the line cards associated with client A, since the data signals are already synchronized with this time reference. However, line cards operating on data for clients B and C may have to be adjusted to synchronize to the timing reference provided by client A. Therefore, it may be necessary for the line cards associated with clients B and C to provide timing delays by way of excessive pointer adjustments in their timing systems to adjust their timing to the timing of client A. This is undesirable since the network performance with respect to clients B and C may be significantly degraded.

Therefore, it would be desirable to have a way to provide timing synchronization signals to the line cards in an NE without having special timing cards and without forcing line cards associated with different clients to synchronize to the same timing reference.

SUMMARY OF THE INVENTION

The present invention includes a synchronization system for providing timing synchronization signals required by line cards in an NE. In one embodiment, the synchronization system is located directly on the line cards so that the need for dedicated timing cards in the NE is eliminated. For example, the synchronization system is located on ADM cards associated with a specific client to provide timing signals to synchronize those ADM cards with a reference provide by that specific client. Because a centralized timing system is not used, the ADM cards for that client are not required to use timing signals associated with a reference for another client's data. Therefore, the ADM cards will not be required to make special timing adjustments to operate on their respective client's data.

In one embodiment of the invention, a timing circuit for use with transport logic in a network element is provided. The network element forms part of a data network and the timing circuit comprises a timing receiver having a timing input, a timing output, and a selection input, the timing receiver operable to receive one or more timing signals at the timing input and to select a selected timing signal for distribution to the transport logic via the timing output based on a selection signal received at the selection input. The timing circuit also includes a determination circuit that is operable to determine whether the timing circuit is one of a master timing circuit and slave timing circuit, and based on the determination, produce the selection signal. A sync transmitter is also included in the circuit. The sync transmitter is coupled to the timing output, the determination circuit, and a communication channel. The sync transmitter is operable to receive the selected timing signal and to transmit the selected timing signal on the communication channel when the determination circuit determines that the timing circuit is the master timing circuit.

In another embodiment of the invention, a method for synchronizing transport logic in a network element that forms part of a data network is provided. The transport logic is used to transport one or more data streams in the data network, wherein each of the one or more data streams has an associated synchronization signal, and wherein the transport logic comprises two or more circuit assemblies that are coupled together via a communication channel. The method comprises steps of determining that a selected circuit assembly is a master circuit assembly and that the remaining circuit assemblies are slave circuit assemblies, receiving at least one associated synchronization signal at the master circuit assembly, synchronizing the master circuit assembly to the at least one associated synchronization signal, distributing the at least one associated synchronization signal from the master circuit assembly to the slave circuit assemblies via the communication channel, and synchronizing the slave circuit assemblies to the at least one associated synchronization signal.

BRIEF DESCRIPTION OF THE DRAWINGS

The forgoing aspects and the attendant advantages of this invention will become more readily apparent by reference to the following detailed description when taken in conjunction with the accompanying drawings wherein.

DETAILED DESCRIPTION OF THE INVENTION

The present invention includes a synchronization system for providing timing synchronization signals required by line cards in an NE used in an optical network. For example, the NE may be one of many NEs used in a Synchronous Optical Network (SONET) and the line cards in the NEs may be ADM transport cards. In one embodiment, the synchronization system is located directly on the line cards so that the need for dedicated timing cards to provide centralized timing in the NE is eliminated. This saves costs and frees up valuable space in the NE. Various embodiments of the synchronization system included in the present invention are discussed in detail in the following text.

Exemplary Embodiment

Figure 1:
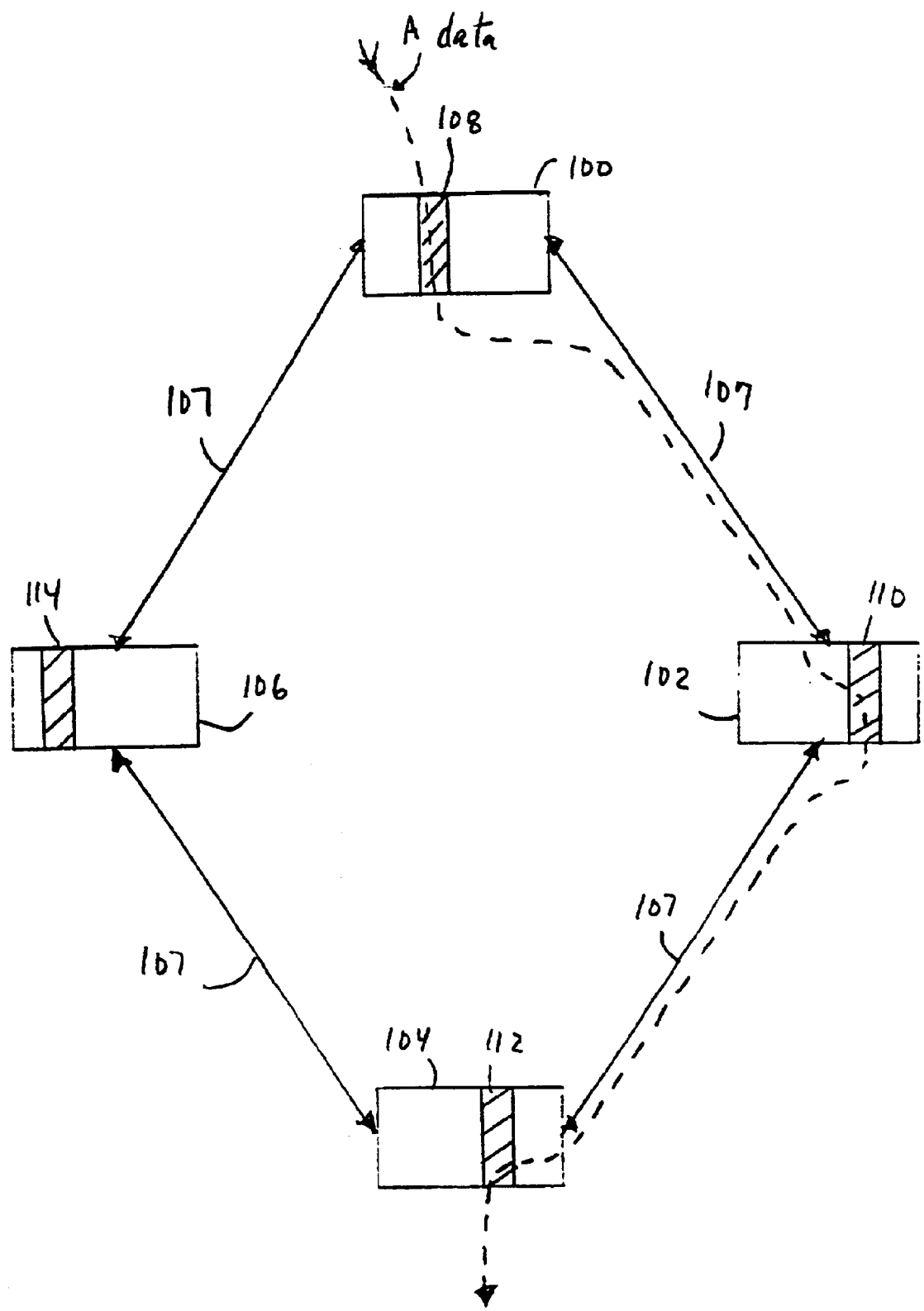
FIG. 1 shows a typical data network including associated network elements.
Figure 2:
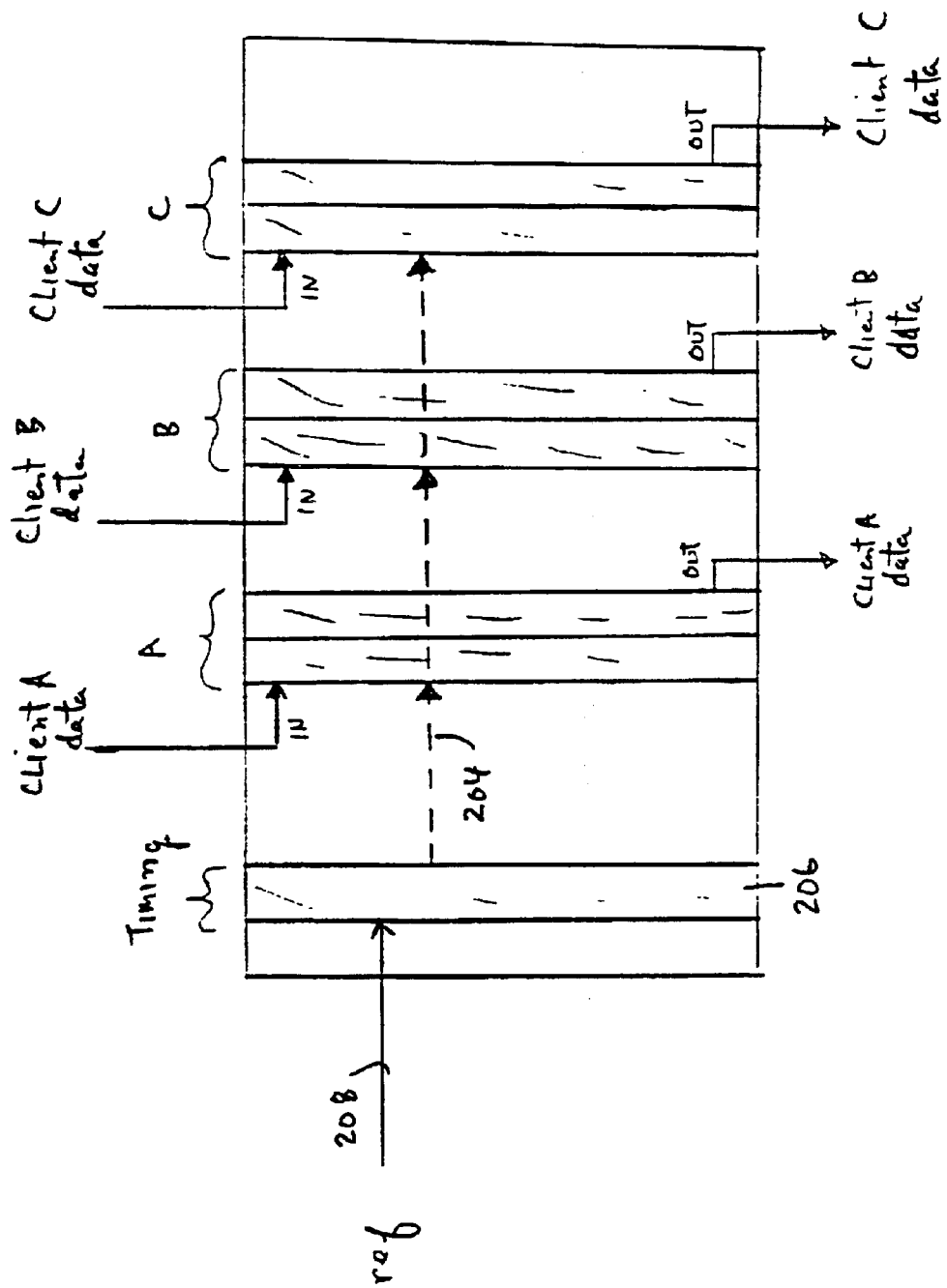
FIG. 2 shows a diagram of a typical network element and it internal configuration.
Figure 3:
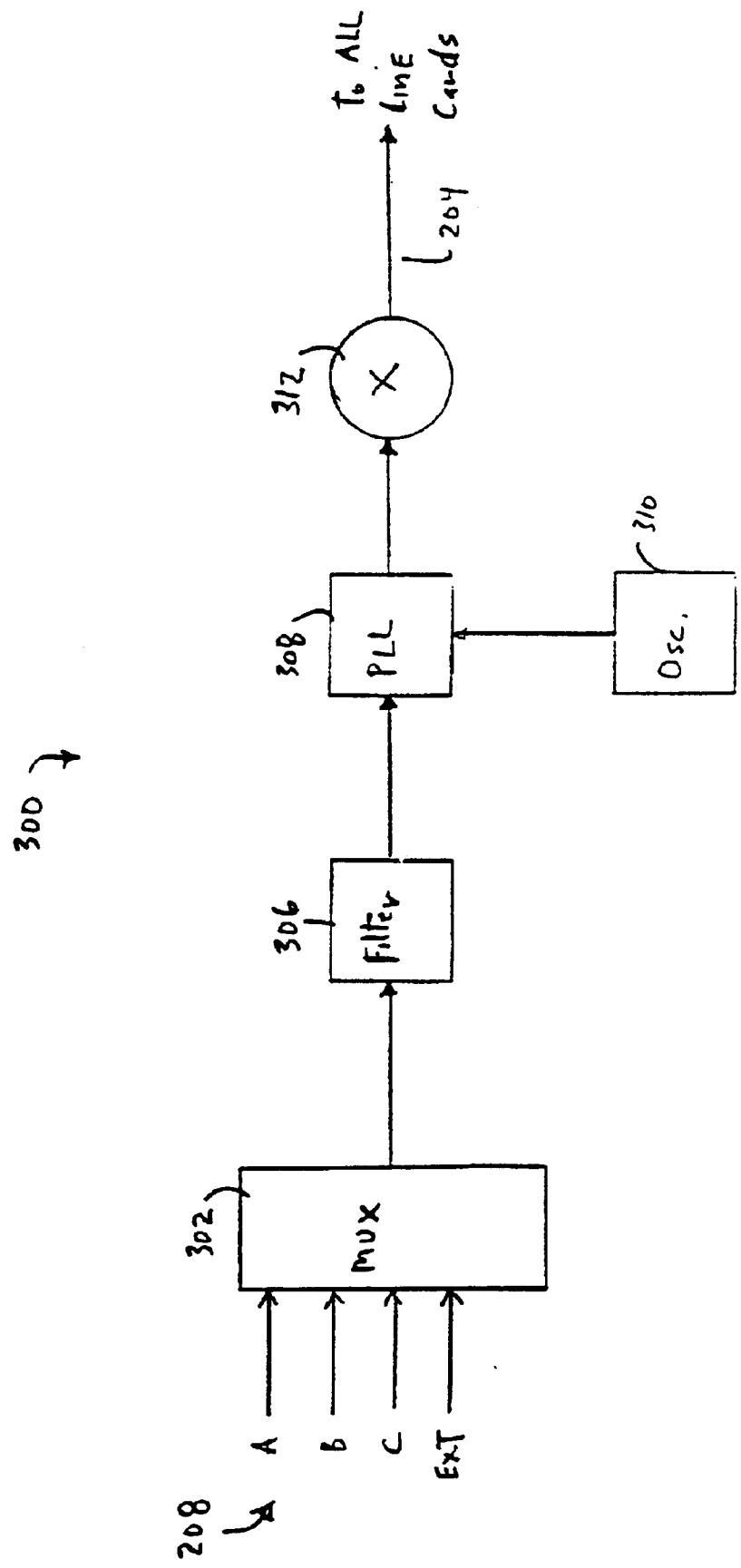
FIG. 3 shows a typical timing circuit used on a dedicated timing card in a network element.
Figure 4:
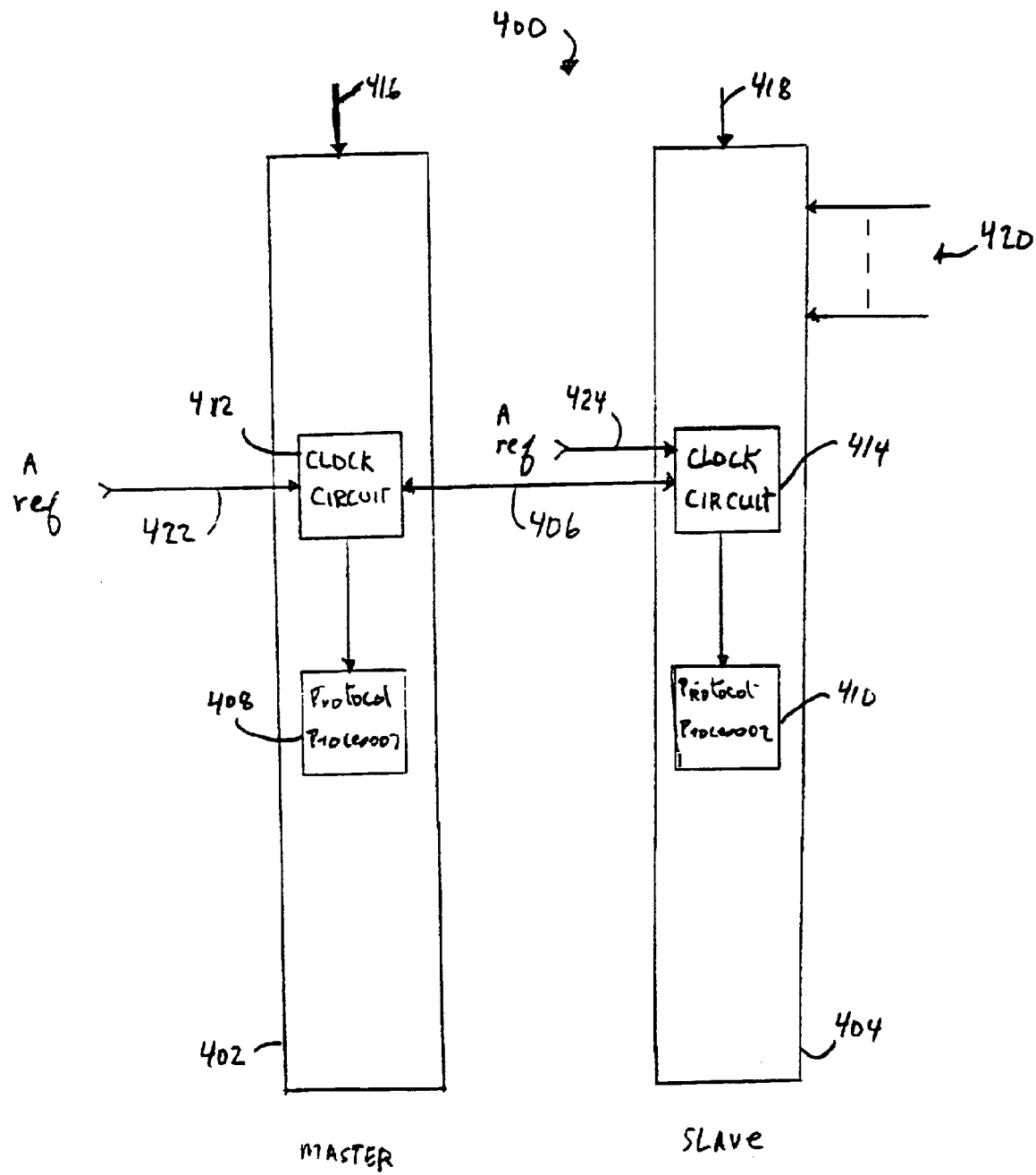
FIG. 4 shows an ADM card set that includes one embodiment of a synchronization circuit included in the present invention.

FIG. 4 shows line cards 400 forming a two card ADM protection pair that include one embodiment of a synchronization system in accordance with the present invention. The ADM cards including the synchronization system are suitable for use as line cards in an NE that is part of an optical network, for example, an NE that operates as part of a SONET network. However, the synchronization system included in the present invention is not limited to use in SONET networks and may be easily adapted to use in a variety of data networks using a variety of network protocols. For example, the timing system is suitable for use with any network card arrangement wherein two or more cards need to be synchronized together. For example, the system is suitable for use with SONET networks, or other networks using network protocols, such as, Synchronous Digital Hierarchy (SDH), Gigabit Ethernet, Fibre Channel, Enterprise System Connection (ESCON) protocols, or any other network protocol. The timing system is also suitable for use in electronic networks where the network elements transmit data electronically and include multiple line cards for each client wherein the line cards for different clients need to be synchronized to different sources.

The ADM card set includes a first card 402 and a second card 404 that are coupled together via communication path 406 to exchange high speed signals without degradation. For example, each of the ADM cards may plug into a backplane provided at the NE so that high speed signals may be exchanged between the cards via a high speed backplane connection. It is also possible that the two cards (402, 404) have a special hard-wired connection between them that allows for high speed communication. For example, the cards may couple to a special cable or may be coupled together via a special connector. Thus, signal path 406 is representative of a high speed communication channel between the cards of the ADM so that communication of high speed signals between the cards can occur without signal degradation.

The first and second cards (402, 404) of the ADM card set have protocol processors (408, 410) for implementing the network protocol required to allow the ADM cards to communicate over the optical network with other ADM card sets located at other NEs. For example, assuming the optical network is a SONET network, the protocol processors may be SONET processors that implement SONET protocols for network communications. Furthermore, the cards (402, 404) may be coupled to optical fibers, as shown at (416, 418), that transmit high speed data using the optical carrier (OC-48) protocol. This protocol allows data transmission at approximately 2.5 Gigabits per second (Gbps). It is also possible that the cards operate to transport low speed data, for example, by coupling to fibers that carry data in accordance with the OC-3 protocol, as shown at 420. The OC-3 protocol allows data transmission at approximately 155 Megabits per second (Mbps). In one embodiment, several low data-rate data streams are combined to form one high data rate stream for transmission over the optical network.

The first and second cards (402, 404) also have clock circuits (412, 414) that are constructed in accordance with the present invention. The clock circuits are given different reference numbers for convenience and to allow a clear understanding of the embodiment, however, in one embodiment the two clock circuits are identical circuits. The clock circuits 412, 414 operate to receive reference signals to produce synchronized timing signals that can be used by their respective protocol processors to synchronize and transport data via the optical network. For example, assuming the ADM card set 400 is dedicated to transport data for client A, then a reference signal associated with client A data is input to clock circuit 412 as shown at 422, and input to clock circuit 414, as shown at 424. The clock circuits may then generate synchronization signals based on these timing inputs. However, it may be possible that the client A references provided at 422, 424 may originate from different sources, and so may not provide adequate synchronization for the protocol processors (408, 410) on the two cards (402, 404) to interact with each other properly.

In one embodiment, one of the clock circuits (412, 414) (the "Master"), provides a timing reference to the other clock circuit. The other clock circuit (the "Slave"), tightly synchronizes itself to the reference from the Master. This is required for the protocol processors to exchange payload data over the high-speed backplane. In this embodiment, the clock circuit 412 receives a time reference from client A that is associated with client A's data, for example, the reference 422. The clock circuit 412 then provides a synchronized time reference to the clock circuit 414, via the high speed backplane connection shown at 406. By providing a time reference associated with client A's data between to the two clock circuits, the ADM card set 400 can be easily synchronized to transport client A's data. Furthermore, if the NE contains multiple ADM card sets, where each ADM card set is associated with a different client's data, each of the ADM card sets can be synchronized to their respective client's data. As a result, the need for a centralized timing system within the NE is eliminated.

In one embodiment, the clock circuits 412, 414 receive several time references and select one of the received time references to use for synchronization. This provides a level of fail safe protection, since it is possible for the clock circuits to select an alternate synchronization signal should a problem with an existing synchronization signal occur. For example, it will be assumed that the clock circuits 412, 414 are synchronized together using a highly synchronized reference that is communicated from clock circuit 412 to clock circuit 414 via the signal path 406. If the circuit card 402 fails, the synchronization signal transmitted from clock circuit 412 to clock circuit 414 may be interrupted. In such a case, the clock circuit 414 continues operation by selecting an alternative time reference, for example, the time reference from client A that is provided at 424.

During switchover to the alternate time reference, a holdover condition occurs. During holdover, the clock circuit 414 keeps outputting timing signals to the protocol processor 410 based on the failed input reference. The clock circuit 414 does this by monitoring the time reference prior to failure and then continuing to output the timing signals based on the timing that was last received. Eventually, the newly selected reference is switched to in a controlled manner so that data is not lost. For example, the clock circuit 414 provides timing signals to the protocol processor 410 based on the failed reference from signal path 406 until timing signals based on reference A (424) can be switched to in a controlled manner. In this mode, with only one card of the ADM card set operating, it is possible to operate that card with the client A time reference only. Thus, one or more embodiments of the invention provide for fail safe operation of the ADM card set.

In the above described embodiments, the synchronization system included in the present invention was described in conjunction with a two card ADM card set (402, 404) where the clock circuit 412 of card 402 provided highly synchronized timing signals to the clock circuit 414 of card 404, via the high speed communication path 406. This configuration forms a "master" and "slave" configuration wherein card 402, as master, provides synchronization signals and card 404, as slave, receives the synchronization signals. However, it is also possible to reverse this configuration so that card 402 is designated the slave and card 404 is designated the master. To determine master and slave designations, a system of messaging included in the present invention is used. The messaging system is discussed in detail in another section of this document.

In the above described embodiments, the synchronization system included in the present invention was used in conjunction with a two card ADM card set. However, the synchronization system is suitable for use with various types and numbers of NE line cards. For example, one or more embodiments of the present invention are suitable for use with a line card set having more than two cards. In this embodiment, each line card includes a clock circuit in accordance with the invention that is coupled to a high speed communication channel. Furthermore, the messaging system included in the present invention allows the cards to determine which card is to be the master and which cards are slaves. Any of the cards may be selected as the master. The selected master provides highly synchronized timing signals to the slaves via the high speed communication channel. The synchronized timing signals that are distributed are derived from one of several timing references available. Therefore, in a multi-card application any number of line cards may be synchronized to a selected master card, wherein specific operating parameters and conditions determine the selection of the master card. Furthermore, the selected reference signal may be derived from a signal initially received by the master card or any of the slave cards. For example, a slave card may receive a timing signal that is directed to the master for use as the main timing reference, which is then distributed to the slave cards via the high speed communication channel.

Figure 5:
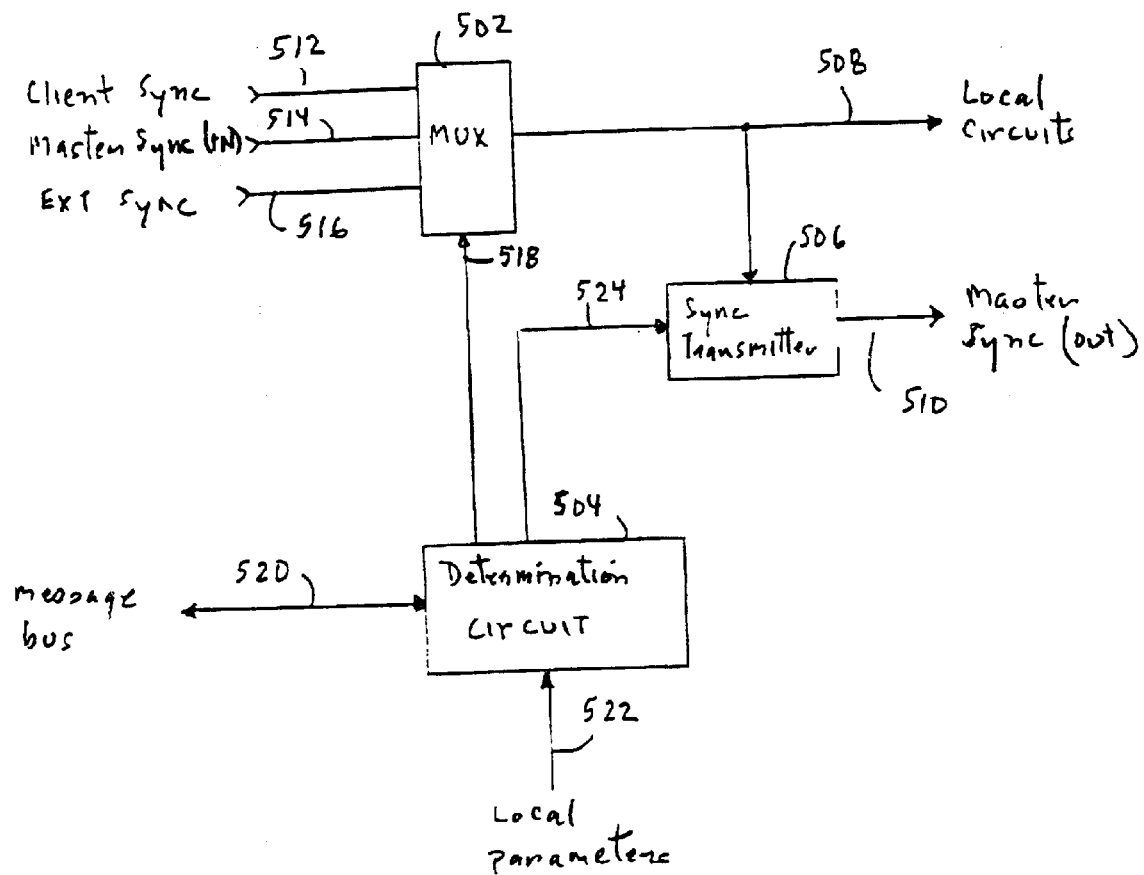
FIG. 5 shows a clock circuit constructed in accordance with the present invention.

FIG. 5 shows a detailed view of the clock circuit 412 constructed in accordance with the present invention. The clock circuit 412 includes a multiplexer 502, a determination circuit 504 and a sync transmitter 506. The clock circuit 412 is not limited for use with the ADM card pair shown in FIG. 4, and in fact, may be used in conjunction with other types and numbers of network line cards, such as a cross-switch line card set.

The multiplexer 502 receives several types of synchronization signals and can select one of the received synchronization signals for distribution to local circuits, as shown at 508. Such local circuits may include a protocol processor, for example, protocol processor 408. The selected synchronization signal can also be distributed to other clock circuits on other line cards as a master sync output signal, as shown at 510. The distribution of the master sync output signal 510 utilizes a high speed communication channel such as signal path 406, which can be formed any type of communication path suitable for transmitting the master sync signal without degradation.

The multiplexer 502 receives a client synchronization signal 512 that is associated with client data to be transported on the network. The multiplexer 502 also receives a master sync in signal 514 that provides timing signals from other line cards via the high speed communication channel. An external sync signal 516, derived from timing signals within the NE, is also received by the multiplexer 502. One of the received timing signals is output (508) by the multiplexer 502 based on a received selection signal 518.

The determination circuit 504 is coupled to a message bus 520 that allows messages to be exchanged between this line card and other line cards within the NE to determine operating modes of line cards. For example, messages may be exchanged to determine that this line card is a "master" line card in accordance with the invention. As the master, the clock circuit on this card selects an input reference signal to use and distributes the selected reference signal to other associated line cards. More details regarding the operation of the message bus are provided in another section of this document.

The determination circuit 504 also includes a local parameter input 522 that can be used to receive local parameters. For example, parameters stored in a memory may be received to restore the determination circuit to a previous state, for example, after a power failure occurs. Once the determination circuit 504 determines the state of the line card (master or slave), the selection signal 518 can be generated. For example, messages may be sent to other cards thereby confirming that the stored configuration is correct and thereafter the selection signal 518 is generated. The selection signal 518 is input to the multiplexer 502 to select a synchronization signal to use for the local circuits, as shown at 508. For example, if the card is determined to be a master, then the client sync signal 512 is selected and distributed. If the card is determined to be a slave, then the master sync in 514 is selected and distributed.

The determination circuit 504 also provides a transmit signal 524 that is input to the sync transmitter 506. The sync transmitter 506 receives the signal selected for use by the local circuits and, if the line card is determined to be a master line card, transmits that signal to other clock circuits via the master sync out signal 510 when the transmit signal is in an active state. The master sync out signal is transmitted via the high speed communication path that couples this clock circuit to other clock circuits of associated line cards in the NE.

Therefore, the clock circuit 412 can receive a variety of sync signals at the multiplexer input, determine an operating mode for the line card, select a sync signal for local use, and transit the selected signal sync for use by other clock circuits when the line card is a master line card.

Exemplary Messaging

In one embodiment of the present invention, the clock circuits located on associated line cards are synchronized so that one clock circuit (master) provides a highly synchronized timing signals to the other clock circuits (slaves). A messaging system is used to provide a way to determination which line card is the master and which line cards are the slaves.

Figure 6:
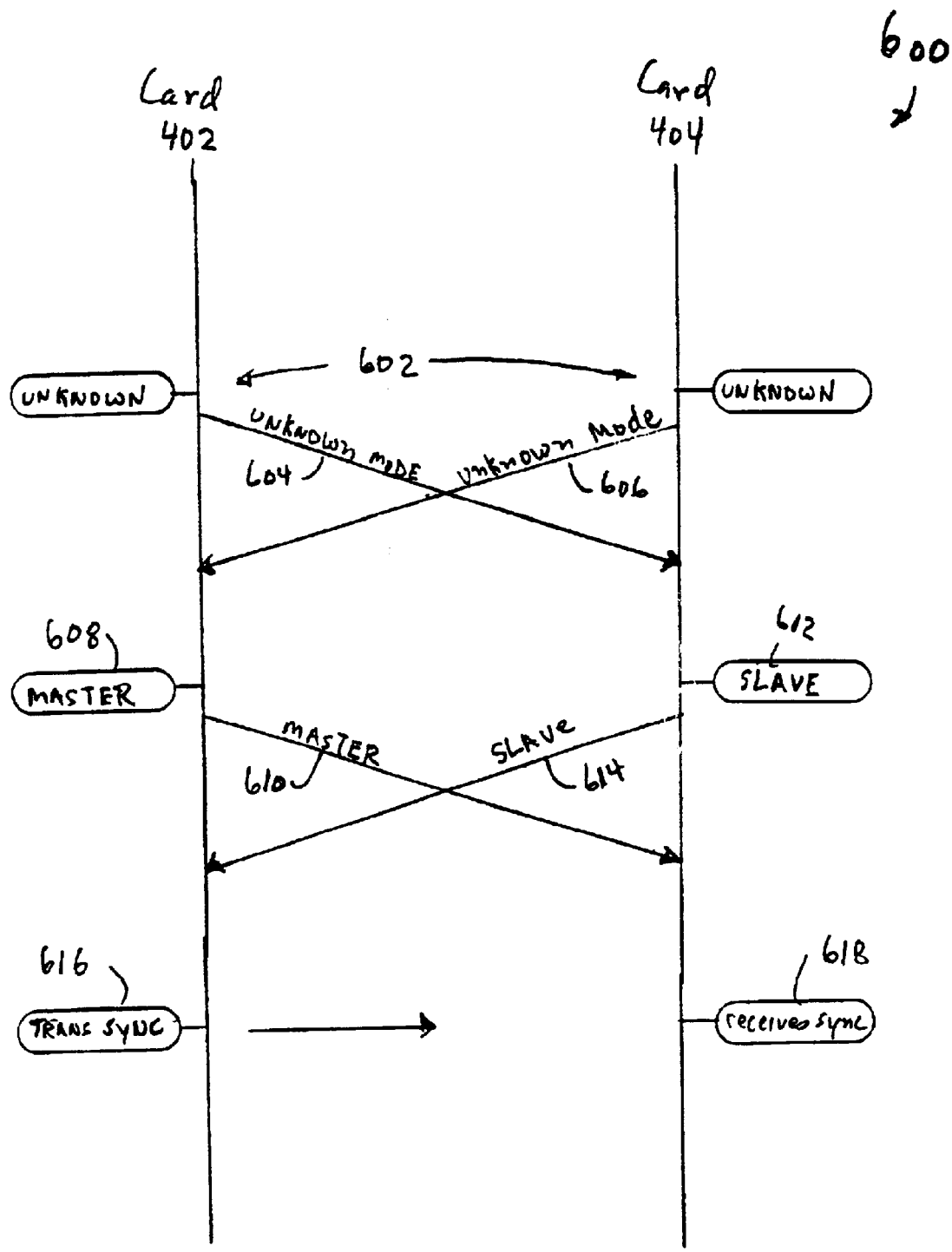
FIG. 6 shows a message sequence sent between cards in a ADM card set in accordance with the present invention.

FIG. 6 shows an exemplary message sequence 600 of messages that can be used in conjunction with the ADM card set 400 to provide a synchronization system in accordance with the present invention. The message sequence 600 is an exemplary message sequence and not intended to represent the only possible message sequence include within the scope of the present invention. In one embodiment, the messaging sequence 600 occurs between line cards via the message bus 520, however, it is possible to use any type of messaging technique to exchange messages between the line cards. Furthermore, any type of messaging format can be use, for example, serial or parallel bit streams with or without parity. Even messages having only a single bit indicator can be used. Therefore, the selection of the messaging technique and message format are not restricted to one implementation, so that virtually any messaging implementation is within the scope of the invention.

In one embodiment, the messaging sequence occurs via the messaging bus 520 that is coupled between determination circuits 504 located on each line card. Referring to FIG. 6, on the left is a vertical line that represents the state of card 402, and on the right is another vertical line represents the state of card 404. Initially, at power up or after a reboot operation, both cards are placed in an unknown state, as shown at 602. Since each card is unsure of its respective operating state, each card transmits a message to the other card that indicates that the card does not know what mode of operation it should be in. For example, the cards send messages to each other via the message bus 520 to indicate that each card's operating mode is undetermined, as shown by messages 604 and 606.

After receiving the unknown message from the other card, each card makes a determination as to what mode it should be in. For example, the cards may determine this by using a position identifier that indicates the location of the card in the NE. In one embodiment, the card furthest to the right in the NE may arbitrarily determine to initially be the master. This can be determined by NE location indicators known to each card. It is also possible to use any other criteria or technique to determine which line card is to be the master and which is to be the slave. Once each card determines its operating mode, it sends a message to the other card describing its operating mode. For example, card 402 determines that it is to operate as the master, as indicated at 608, and sends a message to card 404 indicating it is in master mode, as shown at 610. Furthermore, card 404 determines that it is to operate as the slave, as indicated at 612, and sends a message to card 402 indicating it is in master mode, as shown at 614. As a result, the card 402 transmits synchronization signals as shown at 616, and the card 404 receives synchronization signals as shown at 618. Once the operating mode for each card is determined, the mode is stored in the card so that it is possible for the card to re-establish its mode after an interruption of service. For example, the state is stored as local parameters that can be received by the determination circuit as shown at 522. Therefore, it is possible for the cards of the ADM to determine who is master and slave, and to provide synchronization timing signals to each other in accordance with the present invention.

Multicard Implementation

Although described above with reference to a two card ADM protection pair, one or more embodiments of the present invention are suitable for use with any number of associated line cards. For example, in a line card set having four line cards, the messaging sequence described above can be easily adjusted to allow all four cards to determine their respective operating state including the determination of who is the master. Once the master is determine, the selection of the reference and the distribution of the reference to the other cards (slaves) proceeds as described above. Therefore, there is no limitation to the number or types of line cards that may be synchronized in accordance with the present invention. Furthermore, it is also possible that a single NE contain multiple sets of associated line cards, each set selecting their own respective master card and slave cards. For example, each line card set transports or operates on data streams associated with different clients, wherein each client's data stream may have a different data rate and associated synchronization signals. In this implementation, each master selects a reference associated with its respective client data, so that each line card set may operate using different synchronization signals. By providing a way for all line card sets in the NE to derive their own respective timing signals, the need for a centralized timing system in the NE is completely eliminated. In addition, the line card sets operate more efficiently since it is not necessary for line cards to adjust to timing signals that may not be related to the data they are transporting. For example, a line card set transporting data for client A will not be force to use timing signals derived from client B's data.

The present invention includes a synchronization system for providing timing synchronization signals required by line cards in an NE. The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention which is set forth in the following claims.

What is claimed is:

1. A local timing circuit for direct use with transport logic in a network element forming part of a data network, the local timing circuit comprising:

a timing receiver having a timing input, a timing output, and a selection input, the timing receiver receiving one or more timing signals at the timing input selecting a selected timing signal, and distributing the selected timing signal directly to the transport logic via the timing output based on a selection signal received at the selection input;

a determination circuit receiving input signals operable to determine whether the local timing circuit is one of a master timing circuit or a slave timing circuit, and based on the determination, produce the selection signal; and a sync transmitter coupled to the timing output, the determination circuit, and a communication channel, the sync transmitter operable to receive the selected timing signal and to transmit the selected timing signal on the communication channel when the determination circuit determines that the local timing circuit is the master timing circuit.

2. The local timing circuit of claim 1, wherein the one or more timing signals include a client synchronization signal associated with client data that is to be transported on the data network.

3. The local timing circuit of claim 2, wherein when the determination circuit determines that the local timing circuit is the master timing circuit, the selection signal is generated to select the client synchronization signal associated with client data for distribution to the transport logic.

4. The local timing circuit of claim 1, wherein the timing receiver is coupled to the communication channel and the one or more timing signals include a master sync signal received on the communication channel.

5. The local timing circuit of claim 4, wherein when the determination circuit determines that the local timing circuit is the slave timing circuit, the selection signal is generated to select the master sync signal for distribution to the transport logic.

6. The local timing circuit of claim 1, wherein the one or more timing signals includes an external sync signal provided at the network element.

7. The local timing circuit of claim 1, wherein the determination circuit is coupled to a message bus and is operable to receive at least one message over the message bus to determine whether the local timing circuit is one of the master timing circuit or the slave timing circuit.

8. The local timing circuit of claim 1, wherein the determination circuit is operable to receive at least one local parameter to determine whether the local timing circuit is one of the master timing circuit or the slave timing circuit.

9. A decentralized synchronization system for use in a network element that forms part of a data network, the network element including transport logic to transport one or more data streams in the data network, wherein each of the one or more data streams has an associated synchronization signal, and wherein the transport logic comprises two or more local circuit assemblies that are directly coupled together via a communication channel, the synchronization system comprising:

two or more local determination circuits located on the two or more local circuit assemblies which are directly coupled together via a communication channel, one local determination circuit per local circuit assembly, wherein each local determination circuit includes logic to determine whether its respective circuit assembly is one of a master circuit assembly or a slave circuit assembly; and two or more local timing circuits coupled to the two or more local determination circuits, one local timing circuit per local determination circuit, wherein each local timing circuit includes logic to receive a plurality of synchronization signals and logic to selectively transmit a selected synchronization signal of the plurality of synchronization signals over the communication channel.

10. The synchronization system of claim 9, wherein the plurality of synchronization signals include the associated synchronization signals associated with the data streams to be transported in the data network.

11. The synchronization system of claim 10, wherein when a selected local determination circuit determines that its respective local circuit assembly is the master circuit assembly, the local timing circuit coupled to the selected local determination circuit selects one of the associated synchronization signals as the selected synchronization signal and transmits the selected synchronization signal as a master sync signal over the communication channel.

12. The synchronization system of claim 9, wherein the plurality of synchronization signals include a master sync signal received over the communication channel.

13. The synchronization system of claim 12, wherein when a selected local determination circuit determines that its respective local circuit assembly is the slave circuit assembly, the local timing circuit coupled to the selected determination circuit selects the master sync signal received over the communication channel and uses the master sync signal to synchronize its respective circuit assembly.

14. The synchronization system of claim 9, wherein the two or more local determination circuits are coupled to a message bus and each local determination circuit is operable to receive at least one message over the message bus to determine whether its respective circuit assembly is one of the master circuit assembly or the slave circuit assembly.

15. The synchronization system of claim 9, wherein each of the two or more local determination circuit is operable to receive at least one local parameter to determine whether its respective circuit assembly is one of the master circuit assembly or the slave circuit assembly.

16. A synchronization system for use with an add/drop multiplexer card set in a network element that forms part of an optical network, the add/drop multiplexer card set comprising first and second circuit cards operable to transport data via the optical network, wherein the data has an associated synchronization signal, the synchronization system comprising:

a communication channel directly coupling a card in said add/drop multiplexer card set to another card in said add/drop multiplexer card set;

a determination circuit operable to determine which of the first and second circuit cards is a master circuit card and which is a slave circuit card;

a first timing circuit located on the master circuit card and coupled to the communication channel, the first timing circuit includes logic to receive the associated synchronization signal and to synchronize the master circuit card to the associated synchronization signal, the first timing circuit further including logic to transmit the associated synchronization signal over the communication channel; and a second timing circuit located on the slave circuit card and coupled to the communication channel, the second timing circuit having logic to receive the associated synchronization signal from the communication channel and to synchronize the slave circuit card to the associated synchronization signal.

17. The synchronization system of claim 16, wherein the determination circuit includes logic to determine which of the first and second circuit cards is the master circuit card and which is the slave circuit card by using a card position indicator associated with each card.

18. The synchronization system of claim 16, wherein the determination circuit comprises a first determination circuit coupled to the first timing circuit and a second determination circuit coupled to the second timing circuit, and wherein the first and second determination circuits are coupled to a message bus.

19. The synchronization system of claim 18, wherein the first and second determination circuits include logic to send at least one message over the message bus to determine which of the first and second circuit cards is the master circuit card and which is the slave circuit card.

20. A method for synchronizing transport logic in a network element that forms part of a data network, the transport logic is used to transport one or more data streams in the data network, wherein each of the one or more data streams has an associated synchronization signal, and wherein the transport logic comprises two or more local circuit assemblies that are directly coupled together via a communication channel, the method comprising steps of:

determining that a selected local circuit assembly among said two or more local circuit assemblies which are directly coupled together via a communication channel is a master circuit assembly and that remaining circuit assemblies are slave circuit assemblies;

receiving at least one associated synchronization signal at the master circuit assembly;

synchronizing the master circuit assembly to the at least one associated synchronization signal;

distributing the at least one associated synchronization signal from the master circuit assembly directly to the slave circuit assemblies via the communication channel; and synchronizing the slave circuit assemblies to the at least one associated synchronization signal.

21. The method of claim 20, wherein the step of determining comprises a step of determining that the selected local circuit assembly is a master circuit assembly and that the remaining circuit assemblies are slave circuit assemblies using a position indicator associated with the respective circuit assembly.

22. The method of claim 20, wherein the communication channel includes a message bus and the step of determining comprises a step of determining that the selected local circuit assembly is a master circuit assembly and that the remaining circuit assemblies are slave circuit assemblies using one or more messages transmitted over the message bus.

23. The method of claim 20, wherein the step of determining comprises a step of determining that the selected local circuit assembly is a master circuit assembly and that the remaining circuit assemblies are slave circuit assemblies using at least one stored parameter.

24. The method of claim 20, wherein the transport logic is first transport logic and the one or more data streams are first client data streams, and wherein the network element includes second transport logic, the second transport logic is used to transport one or more second client data streams in the data network, wherein each of the one or more second client data streams has an associated synchronization signal, and wherein the second transport logic comprises two or more circuit assemblies that are coupled together via a second communication channel, the method comprising steps of determining that a selected circuit assembly of the second transport logic is a second master circuit assembly and that remaining circuit assemblies of the second transport logic are second slave circuit assemblies;

receiving at least one associated synchronization signal associated with the second client data streams at the second master circuit assembly;

synchronizing the second master circuit assembly to the at least one associated synchronization signal associated with the second client data streams;

distributing the at least one associated synchronization signal associated with the second client data streams from the second master circuit assembly to the second slave circuit assemblies via the second communication channel; and synchronizing the second slave circuit assemblies to the at least one associated synchronization signal associated with the second client data streams.

* * * * *